O. A. KENYON.
MULTIPLE ARC WELDING.
APPLICATION FILED NOV. 19, 1918. RENEWED JAN. 2, 1920.
1,340,056.  Patented May 11, 1920.
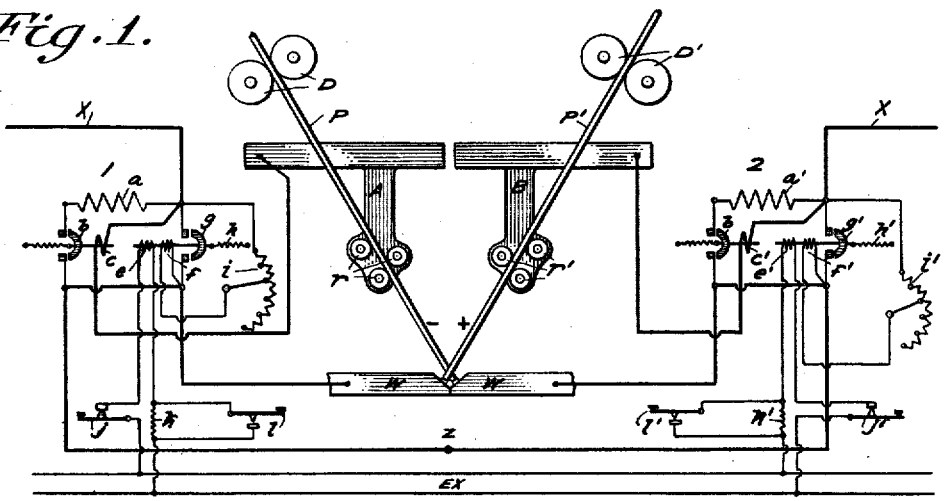
Fig. 1.
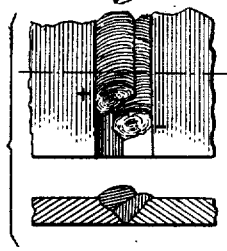
Fig. 2.
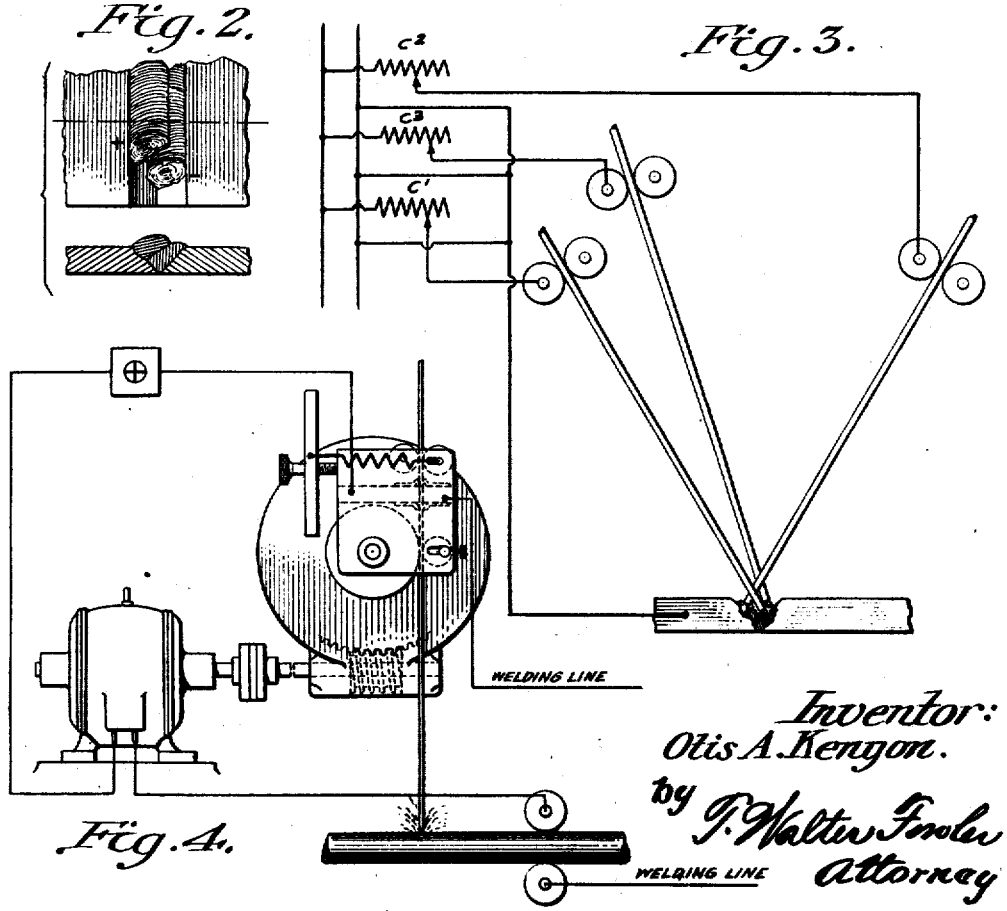
Fig. 3.
Fig. 4.
Inventor:
Otis A. Kenyon.
by P. Walter Fowler
Attorney

UNITED STATES PATENT OFFICE.

OTIS ALLEN KENYON, OF NEW YORK, N. Y.

MULTIPLE-ARC WELDING.

1,340,056.  Specification of Letters Patent.  Patented May 11, 1920.

Application filed November 19, 1918, Serial No. 263,190. Renewed January 2, 1920. Serial No. 349,088.

*To all whom it may concern:*

Be it known that I, OTIS A. KENYON, a citizen of the United States, residing at New York city, in the county of New York and State of New York, have invented certain new and useful Improvements in Multiple-Arc Welding, of which the following is a specification.

My invention relates to certain new and useful improvements in electric arc welding, and particularly to a system of arc welding which employs a plurality of individually controlled welding electrodes adapted to operate simultaneously on the same weld, and where means are provided for maintaining a constant length of arc between each individual electrode and the weld, and my invention consists of the parts and the arrangements and combinations of parts which I will hereinafter describe and set forth in the claims.

In the accompanying drawings forming part of this specification, and in which similar reference characters indicate like parts in the several views;

Figure 1 illustrates more or less diagrammatically one embodiment of my invention;

Fig. 2 illustrates diagrammatically the method of depositing the metal;
Fig. 3 illustrates a modification showing the arrangement of three electrodes.

Fig. 4 illustrates the electrode feeding mechanism.

In metallic arc welding, if highest quality work is to be obtained, the arc must come into actual contact with the surfaces to be fused. Unless the arc does touch every part of the surfaces to be fused, metal from the electrode will run into the joint and simply chill where it strikes the surface without fusing in.

In hand welding, the expert operator manipulates the electrode in such a way as to cause the arc to travel over every part of the adjacent surfaces of the joint. This action is called weaving.

This weaving action is not a simple oscillating motion. Starting on one side of the joint the operator draws the arc along one edge, backs up slightly on the same edge, crosses on the newly deposited metal; travels forward on the other edge, backs up and crosses, and then repeats the whole operation indefinitely until the weld is completed. In this manner the operator fuses both sides of the joint and joins up the two sides with the metal that runs off the end of the electrode.

It is not necessary to weave in all welding operations. For instance, when welding thin sheet, if the edges to be joined are close together so that the arc can touch both at the same time, then the electrode can be advanced in a perfect line along the weld. On the other hand, where the parts to be joined are thicker or are not close together, there are two welding lines and weaving must be employed if proper results are to be attained.

In my former application, Serial Number 209,343, filed December 28, 1917, I have revealed a method of feeding the electrode continuously in such a manner as to maintain a constant length of arc. I also show how this device could be applied to straight line welding.

The present invention has to do with the application of automatically-fed electrodes to joints where straight-line welding is not satisfactory. Heretofore, it has been necessary to provide some more or less complicated mechanism to carry the electrode through the proper motions. I avoid the use of any complicated mechanism by employing more than one arc on the same joint at the same time, each one traveling in a straight line and all being so arranged that the whole surface to be welded will come into actual contact with an arc at every point.

It might be possible to operate these arcs in multiple off the same machine, but unless resistance was used in each arc circuit, there would be a pronounced tendency for "pumping" between the arcs to occur. The best way to accomplish the result would be to feed each arc from a separate generator. However, when not more than two arcs were necessary, the series system covered by my former Patent No. 1,181,227, dated May 2, 1916, could be used advantageously. In the present instance I assume the use of the series system to explain the operation of the method.

In the said drawings, Fig. 1, A and B are electrode feeding devices; 1 and 2 are suitable controlling mechanisms; D, D', are driving rolls; P P' are electrodes; $r$, $r'$ are guide rollers for the electrodes; W, W' are parts to be welded; X is the main welding line circuit; $b$, $b'$ $g$, $g'$, are appropriate contactors; $c$, $c'$ are coils; $h$, $h'$ are springs connected to the contactors; $k$, $k'$ are resistors; $j$, $j'$ and $l$, $l'$ are contact keys; and $i$, $i'$ are rheostats.

In the arrangement described and shown in Fig. 1, the control of the arcs is accomplished by the controllers, 1 and 2, which may be of any desired construction and which operate as follows:

The main welding line circuit is shown at X and it carries the welding current which is supplied from a constant current generator, as will be understood by those skilled in this art. The arcs are shown in operation, in which condition the contactors, $b$ and $g$ are open, said contactor, $b$, being held open by the coil $c$, which carries the current to the arc, and the contactor, $g$, being held open by the spring, $h$, the coil on the said contactor, $g$, being excited by the constant-potential line EX through the resistor, $k$, of suitable construction and the value of which is so chosen that the current through the coil, $e$, is sufficient to hold the contactor closed, but not sufficient to close it. When it is desired to stop welding, the contact making switch or key, $l$, is closed, thus cutting out the resistor, $k$, and allowing sufficient current through the coil, $e$, to close the contactor, $g$, which short-circuits the arc allowing the current to pass directly to the other side through the line X and Y, and thence through the electrode, P', and the controller, 2, to the line X'. As soon as an arc dies out, the spring $d$, closes the contactor, $b$. In order to start the arc again the operator presses the contact key, $j$, which cuts off the current from the coil, $e$, which operation allows the spring, $h$, to open the contactor, $g$, and leave the resistor, $a$, in the circuit, and the drop across this resistor furnishes sufficient voltage to start the arc. The first current through the arc passes through the coil, $c$, and opens the contactor, $b$, thereby leaving the arc alone in the line.

The mechanism described is shown at the left of Fig. 1, but a corresponding arrangement is shown at the right of Fig. 1, by the controller, 2, and it will be understood that this controlling mechanism controls the second arc and operates in exactly the same way as described for the controller, 1. The result is that each arc is absolutely independent of the other.

In the arrangement shown in Fig. 1, the length of the arc is maintained by a proper control of the feeding rollers, D, D', by means of mechanism, say substantially as shown in Fig. 4, but in case the feed is not right or that for any other reason the arc becomes too long the length of said arc can be kept within a given limit by adjusting the rheostat, $i$, in series with a coil, $f$, which is connected across the arc. The passage of the proper amount of current through said coil, $f$, when there is a normal value of current in the coil $e$, will close the contactor, $g$, thus cutting the arc out of the circuit.

In Fig. 2 I show diagrammatically the method of depositing the metal and it will be understood that when the series connection of arcs is used, one of the arcs must be connected with the electrode on the negative side of the circuit and the other on the positive side. Since the positive side of the arc generates about three times as much heat as the negative side, one of these arcs will generate more heat in the electrode than the other; therefore if the same current is used in both the positive electrode will melt faster than the negative one. On this account it is desirable to place the negative electrode a little in advance of the positive one so that the joint will be hotter under the positive electrode and thus tend to equalize the unbalance in temperature. I am permitted to adjust any remaining unbalance by shunting the positive electrode arc with a resistance.

Another factor that enters into the operation of two arcs on the same piece at the same time and in close proximity to each other is the electro-magnetic action. With the positive and negative electrodes the arcs will repulse each other, while with two arcs of the same polarity there would be an attractive action both of which would tend to make the arcs travel around. This interaction of the arcs would assist in making a successful joint as it would keep the arcs from following a perfectly straight line. They would be constantly shifting their position on account of the magnetic action of the current, and thus cause the arcs to play over a larger area than would be covered by operating with each arc operating independently and at considerable distance from one another.

In the arrangement shown more or less diagrammatically in Fig. 3, I employ three electrodes. In this case each electrode is connected with the same polarity on the arc and the current adjustment is obtained by means of the ballast resistances, $c'$, $c^2$, $c^3$, which also serve to prevent surging of current between the arcs. In the same way I might connect any desired number of arcs of either or both polarities to the same piece of work, the number depending only on the size of the joint.

From this description it will be understood that the present invention has particular relation to the application of automatically feeding electrodes to points where straight line welding is not satisfactory, and that I employ a simple mechanism which includes a plurality of individually controlled welding electrodes which are adapted to operate simultaneously on the same weld, each arc traveling in a straight line and all being so arranged that the whole surface to be welded will come into actual contact with an arc at every point.

Having thus described my invention what I claim as new and desire to secure by Letters Patent is:—

1. In automatic electric arc welding, a plurality of individually controlled welding electrodes adapted to operate simultaneously on the same portion of weld.

2. In automatic electric arc welding, individually controlled welding electrodes in series, adapted to operate simultaneously on the same portion of weld.

3. In automatic electric arc welding, a plurality of welding electrodes adapted to operate simultaneously on the same portion of weld, and means for maintaining a constant length of arc between each individual electrode and the weld.

4. In automatic electric arc welding, a plurality of welding electrodes adapted to operate simultaneously on the same portion of weld, and means controlled by the voltage across each individual arc to maintain a constant length of arcs between the electrodes and the weld.

In testimony whereof I affix my signature.

OTIS ALLEN KENYON.